United States Patent
Katayama

(10) Patent No.: US 10,539,483 B2
(45) Date of Patent: Jan. 21, 2020

(54) MISFIRE DETECTION DEVICE FOR INTERNAL COMBUSTION ENGINE

(71) Applicant: TOYOTA JIDOSHA KABUSHIKI KAISHA, Toyota-shi, Aichi-ken (JP)

(72) Inventor: Akihiro Katayama, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 170 days.

(21) Appl. No.: 15/902,468

(22) Filed: Feb. 22, 2018

(65) Prior Publication Data

US 2018/0246011 A1 Aug. 30, 2018

(30) Foreign Application Priority Data

Feb. 28, 2017 (JP) .................... 2017-036334

(51) Int. Cl.
*G01M 15/11* (2006.01)
*F02D 41/14* (2006.01)

(52) U.S. Cl.
CPC .......... *G01M 15/11* (2013.01); *F02D 41/1498* (2013.01); *F02D 2200/1015* (2013.01)

(58) Field of Classification Search
CPC ............... G01M 15/11; F02D 41/1498; F02D 2200/1015; F02D 2041/288; F02D 2041/1432; F02D 2200/101; F02B 77/08
See application file for complete search history.

(56) References Cited

U.S. PATENT DOCUMENTS

| | | | |
|---|---|---|---|
| 5,539,644 A * | 7/1996 | Ichikawa | G01M 15/11 123/436 |
| 5,728,941 A | 3/1998 | Yamamoto et al. | |
| 7,874,203 B2 * | 1/2011 | Suzuki | G01M 15/11 73/114.02 |
| 8,281,650 B2 * | 10/2012 | Kushihama | G01M 15/11 73/114.04 |
| 9,097,193 B2 * | 8/2015 | Oda | F02D 41/0082 |
| 9,453,783 B2 * | 9/2016 | Yu | G01M 15/11 |
| 9,857,273 B2 * | 1/2018 | Hozumi | G01M 15/11 |

FOREIGN PATENT DOCUMENTS

| | | |
|---|---|---|
| JP | H10-054295 A | 2/1998 |
| JP | 2001-098999 A | 4/2001 |
| JP | 2003-113736 A | 4/2003 |
| JP | 2004-308500 A | 11/2004 |
| JP | 2013-234583 A | 11/2013 |

* cited by examiner

*Primary Examiner* — Freddie Kirkland, III
(74) *Attorney, Agent, or Firm* — Oliff PLC

(57) ABSTRACT

A misfire detection device includes an electronic control unit that calculates, based on a crank signal, a first component that is a first integer multiple frequency component of a combustion cycle related to a rotation change value and a second component that is a second integer multiple frequency component of the combustion cycle related to the rotation change value. The electronic control unit determines whether the second component has a maximum value or a minimum value in at least one of two phases of a phase where the first component has a maximum value and a phase where the first component has a minimum value. The electronic control unit determines that an interval between compression top dead centers of cylinders has continuous misfire based on a determination result of whether the second component has a maximum value or a minimum value.

8 Claims, 5 Drawing Sheets

$\Delta NE(n-1) = \omega 120(n-1) - \omega 120(n-2)$
$\Delta NE(n) = \omega 120(n) - \omega 120(n-1)$ $\omega 120 = \dfrac{K}{T120}$

OPPOSING-PAIR CYLINDER MISFIRE

CONSECUTIVE TWO-CYLINDER CONTINUOUS MISFIRE

ONE-CYLINDER CONTINUOUS MISFIRE

INTERMITTENT TWO-CYLINDER MISFIRE

MISFIRE DETECTION DEVICE FOR INTERNAL COMBUSTION ENGINE

INCORPORATION BY REFERENCE

The disclosure of Japanese Patent Application No. 2017-036334 filed on Feb. 28, 2017 including the specification, drawings and abstract is incorporated herein by reference in its entirety.

BACKGROUND

1. Technical Field

The present disclosure relates to a misfire detection device for an internal combustion engine. The misfire detection device is applied to an internal combustion engine having a plurality of cylinders, and detects continuous misfire in at least one cylinder based on a rotation change value acquired by quantifying the difference in the rotational behavior of a crankshaft shown on a crank signal in a rotation angle interval that shows the influence of combustion in each of a pair of cylinders successive in time series order of compression top dead center.

2. Description of Related Art

For example, a device disclosed in Japanese Unexamined Patent Application Publication No. 2003-113736 (JP 2003-113736 A) detects misfires in an internal combustion engine based on the strength of each of a half order rotation (first order cycle) component, a first order rotation (second order cycle) component, and a one-half order rotation (third order cycle) component of time series data of a rotation state parameter that depends on the rotational behavior of a crankshaft shown on a crank signal. Particularly, based on the strength of the third order cycle component, the device identifies a malfunction (one-cylinder continuous misfire) in which misfire continuously occurs in one specific cylinder of an internal combustion engine having six cylinders, and a malfunction (intermittent misfire) in which misfire continuously occurs in a pair of successive cylinders with another cylinder interposed therebetween in time series order of compression top dead center. The reason for using the third order cycle component in the disclosure is because a noticeable difference in strength occurs between the one-cylinder continuous misfire and the intermittent misfire in the third order cycle component while the first order cycle component or the second order cycle component does not have a noticeable difference in strength between the one-cylinder continuous misfire and the intermittent misfire.

In the disclosure of Japanese Unexamined Patent Application Publication No. 10-54295 (JP 10-54295 A), the amount of change in angular velocity (rotation change value) for determining the presence of misfire is calculated based on the difference in rotation speed in a rotation angle region that shows the influence of combustion in each of the cylinders successive in time series order of compression top dead center.

SUMMARY

The present inventors have found that the strength of a predetermined order cycle component of time series data of a rotation change value is affected by disturbances. Thus, the interval between the compression top dead centers of cylinders having continuous misfire may not be specified with merely the strength of the cycle component.

Hereinafter, an aspect of the disclosure and operation effects thereof will be described.

An aspect of the present disclosure relates to a misfire detection device for an internal combustion engine that includes a plurality of cylinders. The misfire detection device includes an electronic control unit configured to detect continuous misfire in at least one cylinder based on a rotation change value. The rotation change value is a value quantified as a difference in a rotational behavior of a crankshaft shown on a crank signal in a rotation angle interval that shows an influence of combustion in each of a pair of cylinders successive in time series order of compression top dead center timing. The electronic control unit is configured to execute a first component calculation process based on the crank signal. The first component calculation process is a process of calculating a first component that is a first integer multiple frequency component of a combustion cycle related to the rotation change value. The electronic control unit is configured to execute a second component calculation process based on the crank signal. The second component calculation process is a process of calculating a second component that is different from the first component and is a second integer multiple frequency component of the combustion cycle related to the rotation change value. The electronic control unit is configured to determine whether the second component has a maximum value or a minimum value in at least one of two phases of a phase where the first component has a maximum value and a phase where the first component has a minimum value. The electronic control unit is configured to execute a misfire determination process of determining an interval between compression top dead centers of cylinders having the continuous misfire based on a determination result of whether the second component has a maximum value or a minimum value.

The inventors have found that given that N and M are integers, even when a magnitude relationship between the strength of an N-th order frequency component and the strength of an M-th order frequency component of time series data of the rotation change value is affected by disturbances, a determination as to whether the M-th order cycle component has a maximum value or a minimum value in a phase where the N-th order cycle component has a maximum value and a phase where the N-th order cycle component has a minimum value is unlikely to be affected by disturbances. Thus, according to the aspect of the present disclosure, the interval between the compression top dead centers of the cylinders having continuous misfire is determined based on whether the M-th order cycle component (second component) has a maximum value or a minimum value in at least one of two phases of the phase where the N-th order cycle component (first component) related to the time series data of the rotation change value has a maximum value and the phase where the N-th order cycle component (first component) has a minimum value. Thus, it is possible to specify the interval that cannot be specified with merely the strength.

In the misfire detection device according to the aspect of the present disclosure, the misfire determination process may be a process of determining the interval between the compression top dead centers of the cylinders having the continuous misfire based on the determination result of whether the second component has a maximum value or a minimum value, and a result of magnitude comparison between strength of at least one component of the first component and the second component and a determination value related to the strength.

According to the aspect of the present disclosure, it is possible to accurately determine the interval between the compression top dead centers of the cylinders having continuous misfire by using the strength of at least one of the first component and the second component in addition to the relative relationship in phase between the first component and the second component.

In the misfire detection device according to the aspect of the present disclosure, the electronic control unit may be configured to execute a changing process of setting the determination value related to the strength to a smaller value when a rotation speed of the crankshaft is high than when the rotation speed of the crankshaft is low.

When the rotation speed of the crankshaft is high, the time interval of the compression top dead center is shorter, and the rotation energy of the crankshaft is higher than when the rotation speed of the crankshaft is low. Thus, a decrease in the rotation speed of the crankshaft in the presence of misfire tends to be decreased when the rotation speed of the crankshaft is high. Such a tendency means that the amount of change shown on the rotation change value acquired from the rotational behavior of the crankshaft at the presence of misfire is smaller when the rotation speed of the crankshaft is high than when the rotation speed of the crankshaft is low. Therefore, according to the aspect of the present disclosure, by setting the determination value to a smaller value when the rotation speed of the crankshaft is high than when the rotation speed of the crankshaft is low, the determination value used for distinguishing a normal operation and a malfunction from each other can be set to an appropriate value according to the rotation speed of the crankshaft.

In the misfire detection device according to the aspect of the present disclosure, the electronic control unit may be configured to execute a determination value setting process of setting the determination value related to the strength to a greater value when a load of the internal combustion engine is high than when the load of the internal combustion engine is low.

When the load of the internal combustion engine is high, energy generated from combustion is higher than when the load of the internal combustion engine is low. Thus, a decrease in the rotation speed of the crankshaft at the presence of misfire tends to be increased when the load of the internal combustion engine is high. Such a tendency means that the amount of change shown on the rotation change value acquired from the rotational behavior of the crankshaft at the presence of misfire is greater when the load of the internal combustion engine is high than when the load of the internal combustion engine is low. Therefore, according to the aspect of the present disclosure, by setting the determination value to a greater value when the load of the internal combustion engine is high than when the load of the internal combustion engine is low, the determination value used for distinguishing a normal operation and a malfunction from each other can be set to an appropriate value according to the rotation speed of the crankshaft.

In the misfire detection device according to the aspect of the present disclosure, the electronic control unit may be configured to calculate a third component based on the crank signal. The third component may be different from the first component and the second component and is a third integer multiple component of the combustion cycle related to the rotation change value. The first component may be a first order cycle component. The second component may be a third order cycle component. The third component may be a second order cycle component. The electronic control unit may be configured to execute an opposing-pair misfire determination process when the electronic control unit determines that strength of the first order cycle component is smaller than a first order determination value for opposing-pair misfire, strength of the third order cycle component is smaller than a third order determination value for opposing-pair misfire, and strength of the second order cycle component exceeds the second order determination value for opposing-pair misfire. The opposing-pair misfire determination process may be a process of determining that continuous misfire is present in a pair of cylinders of the cylinders, the pair of cylinders being at an interval corresponding to one rotation in order of compression top dead center timing.

The inventors have found a tendency that, when continuous misfire occurs in a pair of cylinders of the cylinders, the pair of cylinders being at an interval corresponding to one rotation in order of compression top dead center, the strength of the first order cycle component and the strength of the third order cycle component are low while the strength of the second order cycle component is high. According to the aspect of the present disclosure, in view of such a point, the presence of a malfunction in which continuous misfire occurs in a pair of cylinders of the cylinders, the pair of cylinders being at an interval corresponding to one rotation in order of compression top dead center is determined based on the strength of the first order cycle component, the strength of the second order cycle component, and the strength of the third order cycle component.

The internal combustion engine may be a six-cylinder internal combustion engine. In the misfire detection device, the first component may be a first order cycle component. The second component may be a third order cycle component. The misfire determination process may include at least one of two processes of a process of determining that continuous misfire is present in a pair of cylinders with one cylinder interposed between the cylinders in time series order of compression top dead center, based on a determination that the third order cycle component has a minimum value in a phase where the first order cycle component has a maximum value, and a process of determining that continuous misfire is present in a pair of cylinders with one cylinder interposed between the cylinders in time series order of compression top dead center, based on a determination that the third order cycle component has a maximum value in a phase where the first order cycle component has a minimum value.

The inventors have found that in the six-cylinder internal combustion engine, it is difficult to identify a malfunction (intermittent misfire) in which continuous misfire occurs in the cylinders with one cylinder interposed therebetween in time series order of compression top dead center, and a malfunction (one-cylinder continuous misfire) in which continuous misfire occurs in merely one cylinder of the cylinders, with merely the strength of the first order cycle component or the third order cycle component. The inventors have found that when the intermittent misfire is present, the third order cycle component has a minimum value in a phase where the first order cycle component has a maximum value, and the third order cycle component has a maximum value in a phase where the first order cycle component has a minimum value. Thus, according to the aspect of the present disclosure, the intermittent misfire can be appropriately identified from the one-cylinder continuous misfire based on the phase.

In the misfire detection device according to the aspect of the present disclosure, the rotation change value may be a value acquired by subtracting the rotation speed in a rotation angle interval showing the influence of combustion in one of the cylinders successive in time series order of compression top dead center from the rotation speed in a rotation angle interval showing the influence of combustion in the other cylinder.

According to the aspect of the present disclosure, the degree to which the rotation change value at the time of misfire is affected by a value other than misfire is lower than when the difference between a rotation time period needed for rotation corresponding to the rotation angle interval of one of the cylinders successive in time series order, and a rotation time period needed for rotation corresponding to the rotation angle interval of the other cylinder is used as the rotation change value. Thus, when the determination value is changed, the number of steps for adjusting the determination value can be decreased further than when the difference in rotation time period is used.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Embodiment

Hereinafter, one embodiment of a misfire detection device for an internal combustion engine will be described with reference to the drawings.

Figure 1:
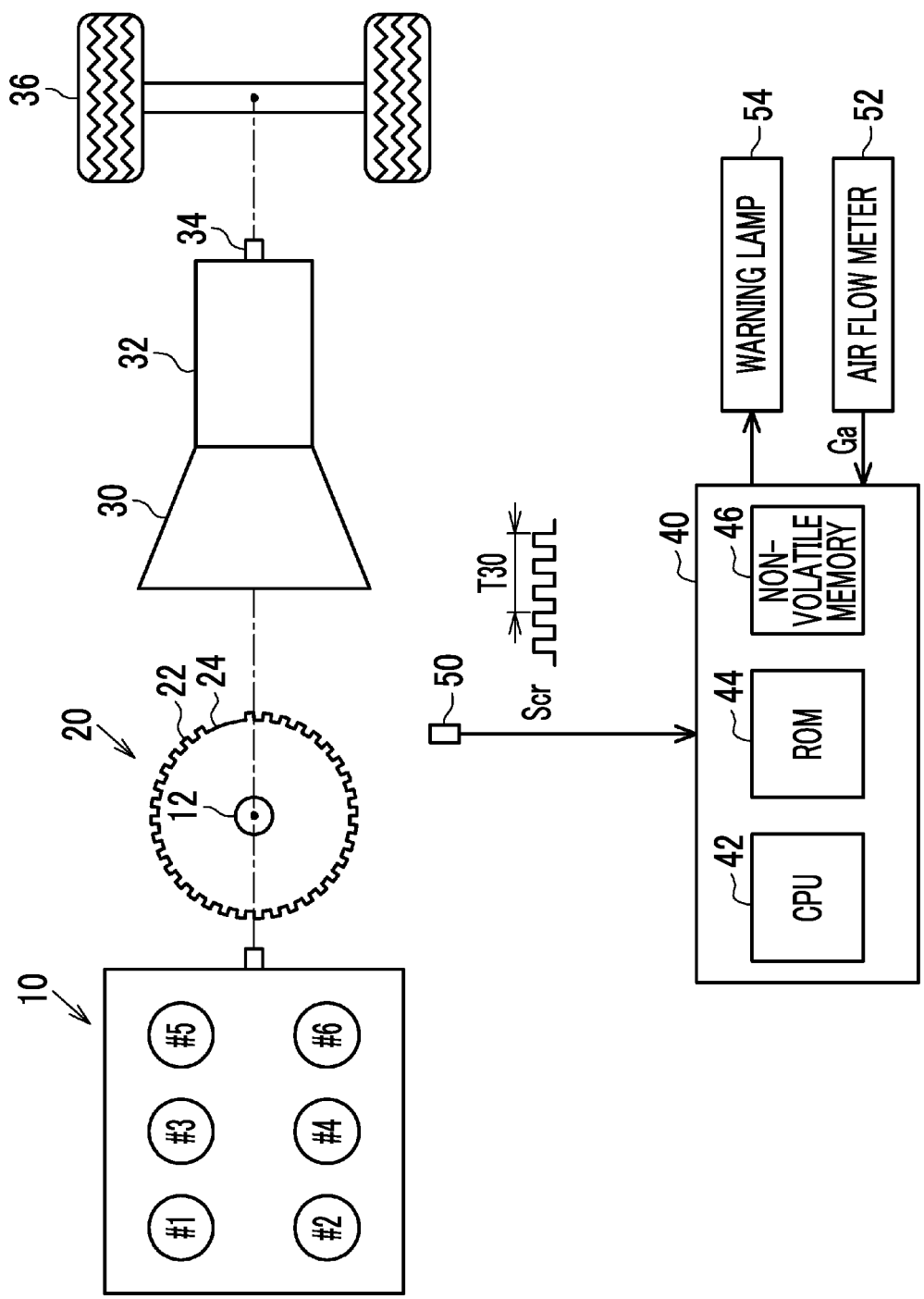
FIG. 1 is a diagram illustrating one embodiment of a misfire detection device and a relevant drive system.

As illustrated in FIG. 1, an internal combustion engine 10 is a four-stroke engine having six cylinders. Particularly, the present embodiment is based on an internal combustion engine in which torque is adjusted with the amount of air filling each cylinder, like a gasoline engine. In the following description, cylinders #1, #2, #3, #4, #5, #6 are defined in accordance with the order of compression top dead center. That is, the cylinder that has the compression top dead center after the first cylinder #1 is the second cylinder #2.

A transmission device 32 can be connected to a crankshaft 12 of the internal combustion engine 10 through a torque converter 30. A drive wheel 36 is mechanically connected to an output shaft 34 of the transmission device 32.

The crankshaft 12 is joined with a crank rotor 20 in which a tooth portion 22 indicating each of a plurality of rotation angles of the crankshaft 12 is disposed. While the tooth portion 22 is disposed basically at 10° CA intervals in the crank rotor 20, one non-tooth portion 24 is disposed in a location where the interval between the adjacent tooth portions 22 is 30° CA. The non-tooth portion 24 indicates the reference rotation angle of the crankshaft 12.

An electronic control unit 40 operates various actuators such as a fuel injection valve in order to control a controlled variable (torque or exhaust constituents) of the internal combustion engine 10. When the electronic control unit 40 controls the controlled variable or executes various diagnosis processes, the electronic control unit 40 references a crank signal Scr of a crank angle sensor 50 that detects the rotation angle of the crankshaft 12 by detecting each tooth portion 22 of the crank rotor 20, and references an intake air amount Ga that is detected by an air flow meter 52. The electronic control unit 40 includes a CPU 42, a ROM 44, and an electrically rewritable non-volatile memory 46. The electronic control unit 40 controls the controlled variable or executes diagnosis processes by the CPU 42 executing a program stored in the ROM 44.

Figure 2:
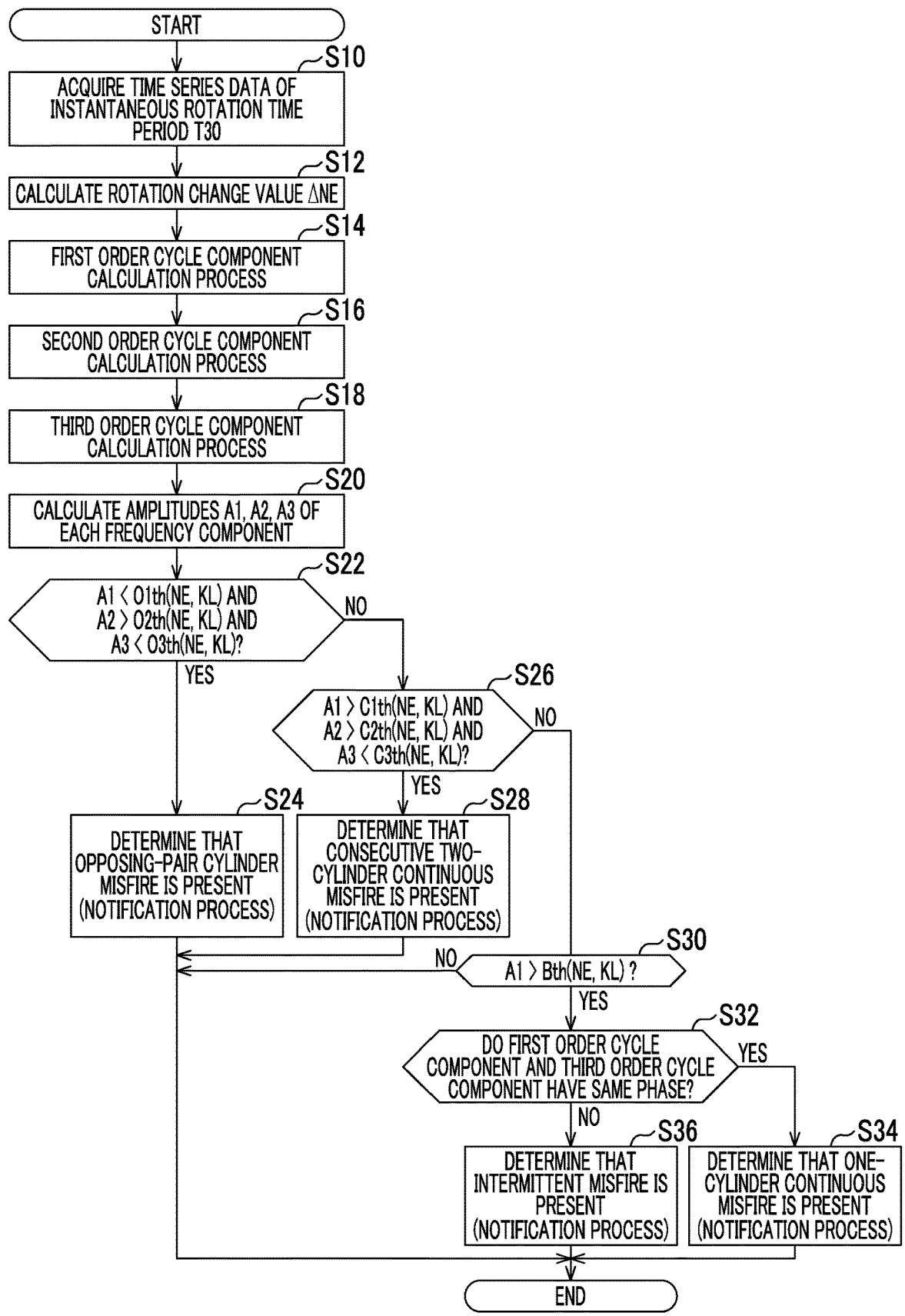
FIG. 2 is a flowchart illustrating a procedure of a misfire detection process according to the embodiment.

FIG. 2 illustrates a procedure of a process of detecting the presence of continuous misfire in a specific cylinder of the internal combustion engine 10 as the diagnosis processes. The process illustrated in FIG. 2 is realized by the CPU 42 repeatedly executing the program stored in the ROM 44 at predetermined cycles.

In the series of processes illustrated in FIG. 2, the CPU 42 first acquires time series data of a time period needed for a rotation of 30° CA (instantaneous rotation time period T30) based on the crank signal Scr (S10). That is, as illustrated in FIG. 1, the CPU 42 sets the instantaneous rotation time period T30 as a time period needed for counting three rising edges or falling edges of pulses of the crank signal Scr. The CPU 42 measures the instantaneous rotation time period T30 in order, thereby generating a plurality of instantaneous rotation time periods T30 that are successive in time series order. The CPU 42 acquires the instantaneous rotation time periods T30 as time series data. The CPU 42 calculates time series data of a rotation change value ΔNE based on the time series data of the instantaneous rotation time period T30 (S12).

Figure 3:
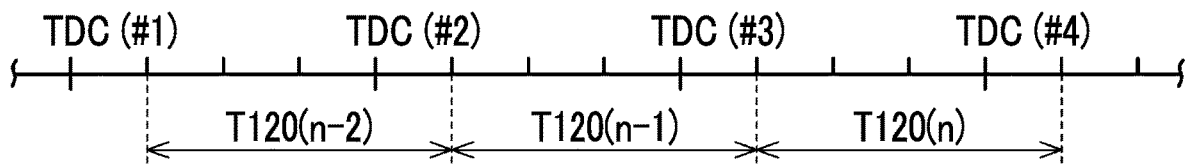
FIG. 3 is a diagram illustrating a process of calculating a rotation change value according to the embodiment.

FIG. 3 illustrates a process of calculating the rotation change value ΔNE. One rotation change value ΔNE is calculated at a time corresponding to a combustion stroke of each of the cylinders #1 to #6. For example, the rotation change value ΔNE corresponding to the second cylinder #2 is a value acquired by subtracting a cylinder-specific rotation speed ω120 in a rotation angle interval of 30 ATDC to 150 ATDC of the first cylinder #1 from the cylinder-specific rotation speed ω120 in a rotation angle interval of 30 ATDC to 150 ATDC of the second cylinder #2. The cylinder-specific rotation speed ω120 of the second cylinder #2 is a value acquired by dividing a predetermined value K by a cylinder-specific rotation time period T120 that is the total value of four instantaneous rotation time periods T30 from 30 ATDC to 150 ATDC of the second cylinder #2. The predetermined value K is a value corresponding to an angular interval of 120° CA and has an angular dimension. The cylinder-specific rotation speed ω120 of the first cylinder #1 is a value acquired by dividing the predetermined value K by the cylinder-specific rotation time period T120 that is the total value of four instantaneous rotation time periods T30 from 30 ATDC to 150 ATDC of the first cylinder #1. In the process of S12, the CPU 42 calculates a plurality of rotation change values ΔNE that are successive in time series order. In FIG. 3, the cylinder-specific rotation speed ω120 and the time series data of the rotation change value ΔNE are represented using a variable n. That is, the rotation change value ΔNE(n) corresponding to the third cylinder #3 is adjacent in time series order to the rotation change value ΔNE(n−1) corresponding to the second cylinder #2, and is generated after the rotation change value ΔNE(n−1) corresponding to the second cylinder #2.

Returning to FIG. 2, the CPU 42 calculates a first order component of the time series data of the rotation change value ΔNE by performing a process of filtering a first order cycle component with the time series data of the rotation change value ΔNE as an input (S14). The first order cycle component is the rotation frequency component of four strokes of a combustion cycle. The process of filtering the first order cycle component may be configured with an FIR filter that takes the time series data of the rotation change value ΔNE as an input.

The CPU 42 calculates a second order component of the time series data of the rotation change value ΔNE by performing a process of filtering a second order cycle component with the time series data of the rotation change value ΔNE as an input (S16). The process of filtering the second order cycle component may be configured with an FIR filter that takes the time series data of the rotation change value ΔNE as an input.

The CPU 42 calculates a third order component of the time series data of the rotation change value ΔNE by performing a process of filtering a third order cycle component with the time series data of the rotation change value ΔNE as an input (S18). The process of filtering the third order cycle component may be configured with an FIR filter that takes the time series data of the rotation change value ΔNE as an input.

The CPU 42 calculates an amplitude A1 of the first order cycle component calculated from the process of S14, an amplitude A2 of the second order cycle component calculated from the process of S16, and an amplitude A3 of the third order cycle component calculated from the process of S18 (S20). The amplitude A1 is the difference between the minimum value and the maximum value in the time series data of the first order cycle component in one combustion cycle. The amplitude A2 is the difference between the minimum value and the maximum value in the time series data of the second order cycle component in one combustion cycle. The amplitude A3 is the difference between the minimum value and the maximum value in the time series data of the third order cycle component in one combustion cycle.

The CPU 42 determines whether or not the logical product of the logical value of whether or not the amplitude A1 of the first order cycle component is smaller than a first order determination value O1th for opposing-pair misfire, the logical value of whether or not the amplitude A2 of the second order cycle component is greater than a second order determination value O2th for opposing-pair misfire, and the logical value of whether or not the amplitude A3 of the third order cycle component is smaller than a third order determination value O3th for opposing-pair misfire is true (S22). The process of S22 is for determining the presence of continuous misfire (hereinafter, referred to as opposing-pair cylinder misfire) that occurs in each of a pair of cylinders having a 360° CA interval between the compression top dead centers thereof such as the cylinder #1 and the cylinder #4.

Figure 4:
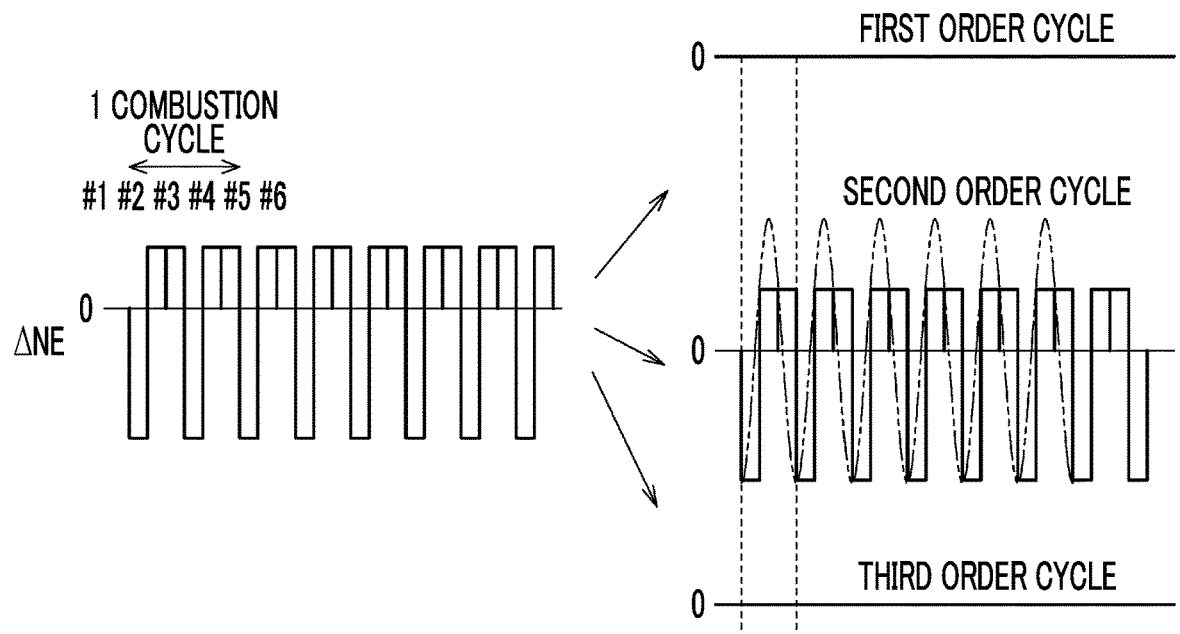
FIG. 4 is a time chart illustrating time series data at the time of an opposing-pair cylinder misfire according to the embodiment.

FIG. 4 illustrates the time series data of the rotation change value ΔNE, the first order cycle component, the second order cycle component, and the third order cycle component when the opposing-pair cylinder misfire is present. As illustrated in FIG. 4, when the opposing-pair cylinder misfire occurs, a noticeable difference occurs between the minimum value and the maximum value of the second order cycle component while the first order cycle component or the third order cycle component does not have a noticeable difference between the minimum value and the maximum value thereof. In FIG. 4, a solid line illustrates the second order cycle component, and a chain double-dashed line illustrates a sine wave having the period and the phase of the second order cycle component.

The process of S22 illustrated in FIG. 2 is a process of determining the presence of the opposing-pair cylinder misfire based on the pattern illustrated in FIG. 4. The CPU 42 can change any of the first order determination value O1th for opposing-pair misfire, the second order determination value O2th for opposing-pair misfire, and the third order determination value O3th for opposing-pair misfire in accordance with a rotation speed NE and a load KL. The rotation speed NE is calculated by the CPU 42 from the instantaneous rotation time periods T30 and particularly, indicates the average value of the rotation speed in a rotation angle interval longer than the rotation angle interval used in calculation of the cylinder-specific rotation speed ω120. The load KL is a quantity correlated with the amount of air filling each cylinder, and is calculated based on the rotation speed NE and the intake air amount Ga.

More specifically, the CPU 42 sets each of the first order determination value O1th for opposing-pair misfire, the second order determination value O2th for opposing-pair misfire, and the third order determination value O3th for opposing-pair misfire to a smaller value when the rotation speed NE is high than when the rotation speed NE is low, even when the load KL is the same. The reason is because a decrease in rotation speed due to misfire is more unlikely to occur when the rotation speed NE is high than when the rotation speed NE is low. The CPU 42 sets each of the first order determination value O1th for opposing-pair misfire, the second order determination value O2th for opposing-pair misfire, and the third order determination value O3th for opposing-pair misfire to a greater value when the load KL is high than when the load KL is low, even when the rotation speed NE is the same. The reason is because a decrease in rotation speed due to misfire is further increased when the load KL is high than when the load KL is low.

Specifically, for each of the first order determination value O1th for opposing-pair misfire, the second order determination value O2th for opposing-pair misfire, and the third order determination value O3th for opposing-pair misfire, the ROM 44 stores a two-dimensional map that defines the relationship between the rotation speed NE and the load KL as an input variable and the determination value as an output variable. The CPU 42 maps the first order determination value O1th for opposing-pair misfire, the second order determination value O2th for opposing-pair misfire, and the third order determination value O3th for opposing-pair misfire based on the two-dimensional map. The map is set data of discrete values of the input variable and the value of the output variable corresponding to each value of the input variable. For example, the mapping may be a process of calculating the corresponding value of the output variable as a calculation result when the value of the input variable matches any value of the input variable in the map, and calculating a value acquired by interpolating a plurality of values of the output variable included in the set data as a calculation result when the value of the input variable does not match any value of the input variable in the map.

When the CPU 42 determines that the logical product is true (S22: YES), the CPU 42 determines that the opposing-pair cylinder misfire is present (S24). That is, the CPU 42 determines that the opposing-pair cylinder misfire is present when the amplitude A1 of the first order cycle component is smaller than a first order determination value O1th for opposing-pair misfire, the amplitude A2 of the second order cycle component is greater than a second order determination value O2th for opposing-pair misfire, and the amplitude A3 of the third order cycle component is smaller than a third order determination value O3th for opposing-pair misfire. In such a case, the CPU 42 specifies a pair of cylinders having continuous misfire based on the time series data of the rotation change value ΔNE. The CPU 42 operates a warning lamp 54 illustrated in FIG. 1 to notify a user of the malfunction, and stores the content of the malfunction in the non-volatile memory 46. Storing the content of the malfunction in the non-volatile memory 46 enables the content of the malfunction to be exported to an external entity with a device that exports information from the electronic control unit 40. Thus, the process of storing the content of the malfunction is a process for notifying an external entity of the content of the malfunction.

When the CPU 42 determines that the logical product is false (S22: NO), the CPU 42 transitions to the process of S26. In the process of S26, the CPU 42 determines whether or not the logical product of the logical value of whether or not the amplitude A1 of the first order cycle component is greater than a first order determination value C1th for consecutive two-cylinder continuous misfire, the logical value of whether or not the amplitude A2 of the second order cycle component is greater than a second order determination value C2th for consecutive two-cylinder continuous misfire, and the logical value of whether or not the amplitude A3 of the third order cycle component is smaller than a third order determination value C3th for consecutive two-cylinder continuous misfire is true (S26). The process of S26 is for determining the presence of continuous misfire (consecutive two-cylinder continuous misfire) occurring in each of a pair of cylinders, the cylinders being adjacent to each other in time series order of compression top dead center timing.

Figure 5:
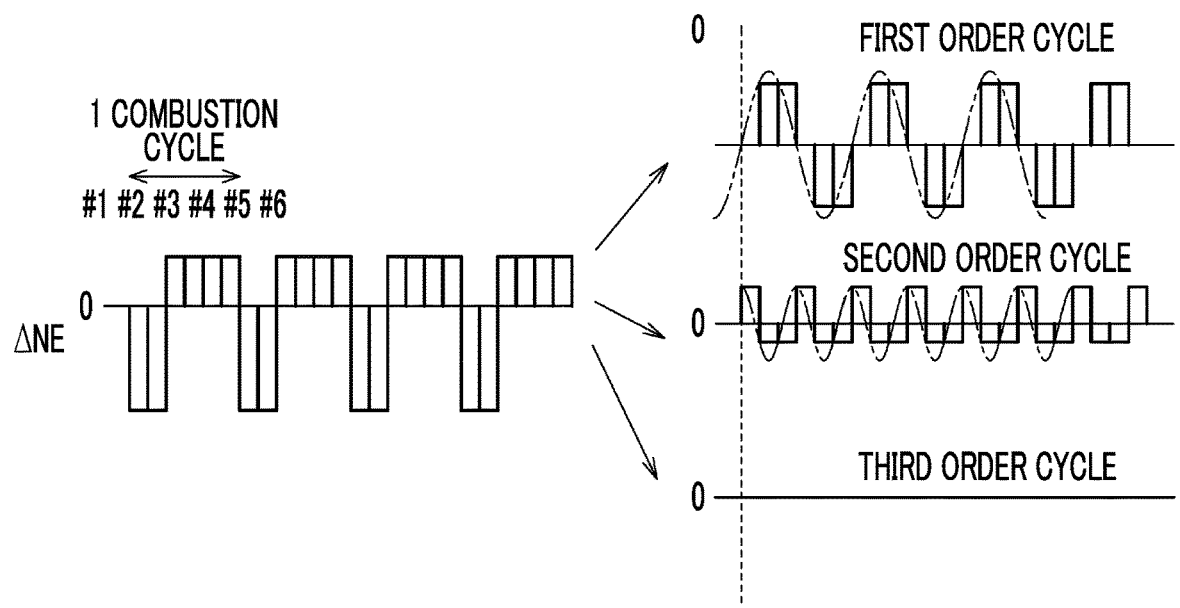
FIG. 5 is a time chart illustrating time series data at the time of consecutive two-cylinder continuous misfire according to the embodiment.

FIG. 5 illustrates the time series data of the rotation change value ΔNE, the first order cycle component, the second order cycle component, and the third order cycle component when the consecutive two-cylinder continuous misfire is present. As illustrated in FIG. 5, when the consecutive two-cylinder continuous misfire occurs, a noticeable difference occurs between the minimum value and the maximum value of the first order cycle component or the second order cycle component while the third order cycle component does not have a noticeable difference between the minimum value and the maximum value thereof. In FIG. 5, a solid line illustrates the first order cycle component and the second order cycle component, and a chain double-dashed line illustrates a sine wave having the period and the phase of each of the first order cycle component and the second order cycle component.

The process of S26 in FIG. 2 is a process of determining the presence of the consecutive two-cylinder continuous misfire based on the pattern illustrated in FIG. 5. The CPU 42 can change any of the first order determination value C1th for consecutive two-cylinder continuous misfire, the second order determination value C2th for consecutive two-cylinder continuous misfire, and the third order determination value C3th for consecutive two-cylinder continuous misfire in accordance with the rotation speed NE and the load KL. More specifically, the CPU 42 sets each of the first order determination value C1th for consecutive two-cylinder continuous misfire, the second order determination value C2th for consecutive two-cylinder continuous misfire, and the third order determination value C3th for consecutive two-cylinder continuous misfire to a smaller value when the rotation speed NE is high than when the rotation speed NE is low, even when the load KL is the same. The CPU 42 sets each of the first order determination value C1th for consecutive two-cylinder continuous misfire, the second order determination value C2th for consecutive two-cylinder continuous misfire, and the third order determination value C3th for consecutive two-cylinder continuous misfire to a greater value when the load KL is high than when the load KL is low, even when the rotation speed NE is the same.

Specifically, for each of the first order determination value C1th for consecutive two-cylinder continuous misfire, the second order determination value C2th for consecutive two-cylinder continuous misfire, and the third order determination value C3th for consecutive two-cylinder continuous misfire, the ROM 44 stores a two-dimensional map that defines the relationship between the rotation speed NE and the load KL as an input variable and the determination value as an output variable. The CPU 42 maps the first order determination value C1th for consecutive two-cylinder continuous misfire, the second order determination value C2th for consecutive two-cylinder continuous misfire, and the third order determination value C3th for consecutive two-cylinder continuous misfire based on the two-dimensional map.

When the CPU 42 in the process of S26 determines that the logical product is true, the CPU 42 determines that the consecutive two-cylinder continuous misfire is present (S28). In such a case, the CPU 42 specifies the cylinders having continuous misfire based on the time series data of the rotation change value ΔNE. The CPU 42 operates the warning lamp 54 illustrated in FIG. 1 to notify the user of the malfunction, and stores the content of the malfunction in the non-volatile memory 46.

When the CPU 42 in the process of S26 makes a negative determination, the CPU 42 determines whether or not the amplitude A1 of the first order cycle component is greater than a pre-identification determination value Bth (S30). The process of S30 is for determining the presence of misfire (hereinafter, referred to as one-cylinder continuous misfire) occurring in one specific cylinder, or the presence of continuous misfire (hereinafter, referred to as intermittent misfire) occurring in a pair of cylinders with one cylinder interposed therebetween in time series order of compression top dead center timing.

Figure 6:
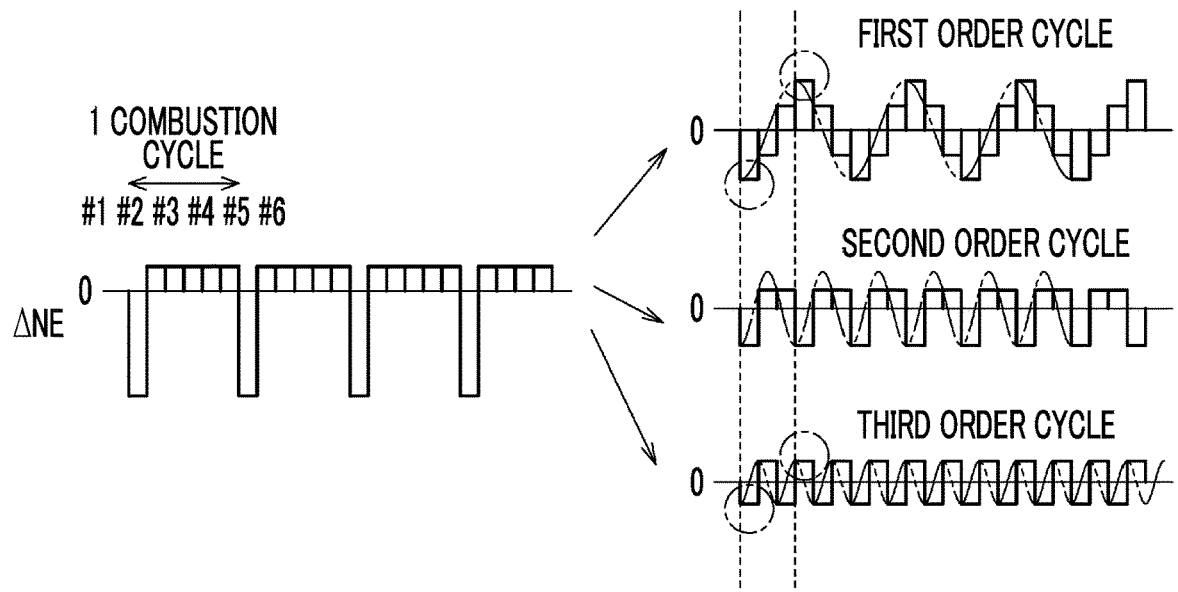
FIG. 6 is a time chart illustrating time series data at the time of one-cylinder continuous misfire according to the embodiment.

FIG. 6 illustrates the time series data of the rotation change value ΔNE, the first order cycle component, the second order cycle component, and the third order cycle component when the one-cylinder continuous misfire is present. More specifically, FIG. 6 is an illustration of when continuous misfire is present in the first cylinder #1. As illustrated in FIG. 6, when the one-cylinder continuous misfire occurs, a noticeable difference occurs between the minimum value and the maximum value of each of the first order cycle component, the second order cycle component, and the third order cycle component. In FIG. 6, a solid line illustrates the first order cycle component, the second order cycle component, and the third order cycle component, and a chain double-dashed line illustrates a sine wave having the period and the phase of each of the first order cycle component, the second order cycle component, and the third order cycle component.

Figure 7:
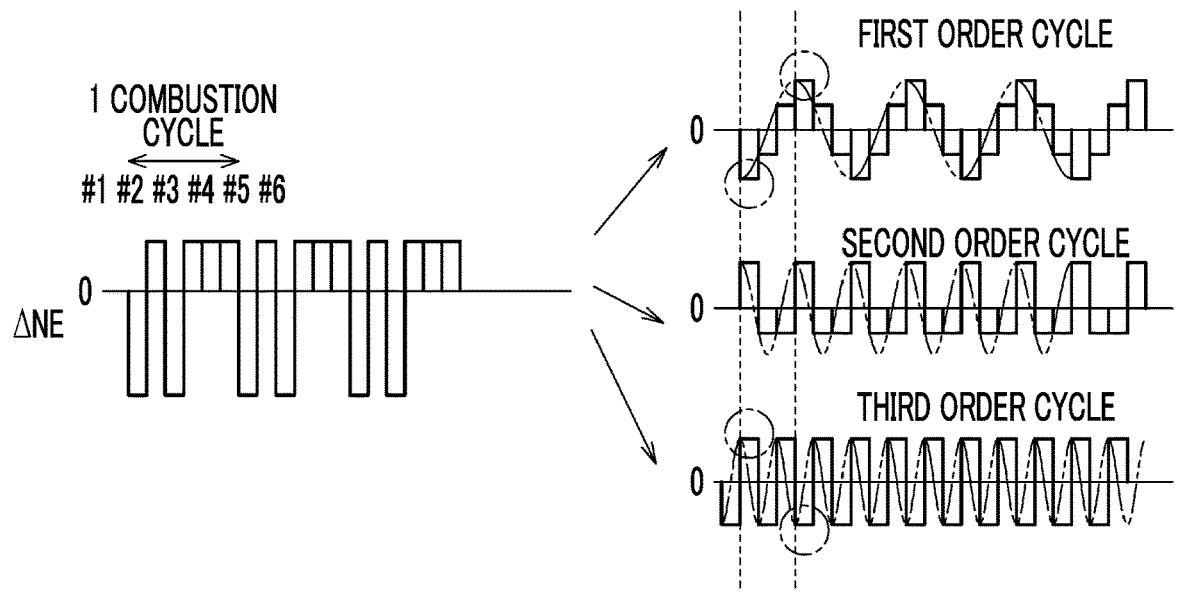
FIG. 7 is a time chart illustrating time series data at the time of an intermittent misfire according to the embodiment.

FIG. 7 illustrates the time series data of the rotation change value ΔNE, the first order cycle component, the second order cycle component, and the third order cycle component when the intermittent misfire is present. More specifically, FIG. 6 is an illustration of when continuous misfire is present in the first cylinder #1 and the third cylinder #3. As illustrated in FIG. 7, when the intermittent misfire occurs, a noticeable difference occurs between the minimum value and the maximum value of each of the first order cycle component, the second order cycle component, and the third order cycle component. In FIG. 7, a solid line illustrates the first order cycle component, the second order cycle component, and the third order cycle component, and a chain double-dashed line illustrates a sine wave having the period and the phase of each of the first order cycle component, the second order cycle component, and the third order cycle component.

As illustrated in FIG. 6 and FIG. 7, in both of the one-cylinder continuous misfire and the intermittent misfire, a noticeable difference occurs between the minimum value and the maximum value of each of the first order cycle component, the second order cycle component, and the third order cycle component. The four patterns in FIG. 4 to FIG. 7 are specified in the process illustrated in FIG. 2 as a pattern of continuous misfire in a predetermined cylinder. Thus, in the process of S30 in FIG. 2, the CPU 42 determines merely whether or not there is a noticeable difference between the minimum value and the maximum value of the first order cycle component. That is, for example, when there is a noticeable difference between the minimum value and the maximum value of each of the first order cycle component and the third order cycle component, and such a noticeable difference is not present in the second order cycle component, a positive determination may be made in the process of S30. However, since such a pattern does not exist, merely the amplitude A1 of the first order cycle component is acquired in the process of S30.

More specifically, the CPU 42 changes the pre-identification determination value Bth based on the rotation speed NE and the load KL. The CPU 42 sets the pre-identification determination value Bth to a smaller value when the rotation speed NE is high than when the rotation speed NE is low, even when the load KL is the same. The CPU 42 sets the pre-identification determination value Bth to a greater value when the load KL is high than when the load KL is low, even when the rotation speed NE is the same. Specifically, the ROM 44 stores a two-dimensional map that defines the relationship between the rotation speed NE and the load KL as an input variable and the pre-identification determination value Bth as an output variable. The CPU 42 maps the pre-identification determination value Bth based on the two-dimensional map.

When the CPU 42 determines that the amplitude A1 is greater than the pre-identification determination value Bth (S30: YES), the CPU 42 determines whether or not the first order cycle component and the third order cycle component have the same phase (S32). The process of S32 is a process for identifying whether the one-cylinder continuous misfire or the intermittent misfire is present. That is, as illustrated by a dot-dashed line in FIG. 6, when the one-cylinder continuous misfire occurs, the third order cycle component has the minimum value at a timing when the first order cycle component has the minimum value, and the third order cycle component has the maximum value at a timing when the first order cycle component has the maximum value. Hereinafter, the first order cycle component and the third order cycle component will be regarded as having the same phase in such a case. As illustrated by a dot-dashed line in FIG. 7, when the intermittent misfire occurs, the third order cycle component has the maximum value at a timing when the first order cycle component has the minimum value, and the third order cycle component has the minimum value at a timing when the first order cycle component has the maximum value. Hereinafter, the first order cycle component and the third order cycle component will be regarded as having opposite phases in such a case. As the process of S32, the CPU 42 executes at least one of two processes including a determination process as to whether the third order cycle component has the maximum value or the minimum value when the first order cycle component has the minimum value, and a determination process as to whether the third order cycle component has the maximum value or the minimum value when the first order cycle component has the maximum value.

When the CPU 42 determines that the first order cycle component and the third order cycle component have the same phase (S32: YES), the CPU 42 determines that the one-cylinder continuous misfire is present (S34). In the process of S34, the CPU 42 specifies one cylinder having continuous misfire based on the time series data of the rotation change value ΔNE, notifies the user of the malfunction by operating the warning lamp 54, and stores the content of the malfunction in the non-volatile memory 46.

When the CPU 42 determines that the first order cycle component and the third order cycle component have opposite phases (S32: NO), the CPU 42 determines that the intermittent misfire is present (S36). In the process of S36, the CPU 42 specifies the cylinders having continuous misfire based on the time series data of the rotation change value ΔNE, notifies the user of the malfunction by operating the warning lamp 54, and stores the content of the malfunction in the non-volatile memory 46.

The CPU 42 temporarily finishes the series of processes illustrated in FIG. 2 when the process of S24, S28, S34, or S36 is completed, or when a negative determination is made in the process of S30. The action of the present embodiment will be described.

When the CPU 42 calculates the time series data of the rotation change value ΔNE based on the crank signal Scr, the CPU 42 calculates the first order cycle component, the second order cycle component, and the third order cycle component of the time series data. The CPU 42 determines whether the one-cylinder continuous misfire, the consecutive two-cylinder continuous misfire, the intermittent misfire, or the opposing-pair misfire is present based on the first order cycle component, the second order cycle component, and the third order cycle component. By using the first order cycle component, the second order cycle component, and the third order cycle component, it is possible to determine continuous misfire while suppressing the influence of noise further than when determining a pattern of the time series data of the rotation change value ΔNE.

Particularly, by identifying the one-cylinder continuous misfire and the intermittent misfire based on whether the first order cycle component and the third order cycle component have the same phase or opposite phases, it is possible to accurately identify the one-cylinder continuous misfire and the intermittent misfire while suppressing the influence of noise further than when identifying the one-cylinder continuous misfire and the intermittent misfire from merely the strength of each of the first order cycle component, the second order cycle component, and the third order cycle component. According to the present embodiment described heretofore, the following effects are also achieved.

A determination that the one-cylinder continuous misfire or the intermittent misfire is present is made on the condition that the amplitude A1 is greater than the pre-identification determination value Bth. By using the amplitude A1, it is possible to improve the accuracy of determination of the one-cylinder continuous misfire and the intermittent misfire further than when not using the amplitude A1.

Each of the first order determination value O1th for opposing-pair misfire, the second order determination value O2th for opposing-pair misfire, the third order determination value O3th for opposing-pair misfire, the first order determination value C1th for consecutive two-cylinder continuous misfire, the second order determination value C2th for consecutive two-cylinder continuous misfire, the third order determination value C3th for consecutive two-cylinder continuous misfire, and the pre-identification determination value Bth is set to a smaller value when the rotation speed NE is high than when the rotation speed NE is low. Accordingly, the determination value that is used for distinguishing a normal operation and a malfunction from each other can be set to an appropriate value according to the rotation speed NE.

Each of the first order determination value O1th for opposing-pair misfire, the second order determination value O2th for opposing-pair misfire, the third order determination value O3th for opposing-pair misfire, the first order determination value C1th for consecutive two-cylinder continuous misfire, the second order determination value C2th for consecutive two-cylinder continuous misfire, the third order determination value C3th for consecutive two-cylinder continuous misfire, and the pre-identification determination value Bth is set to a greater value when the load KL is high than when the load KL is low. Accordingly, the determination value that is used for distinguishing a normal operation and a malfunction from each other can be set to an appropriate value according to the load.

The rotation change value $\Delta NE$ is quantified as a difference in cylinder-specific rotation speed $\omega 120$. Accordingly, the degree to which the rotation change value $\Delta NE$ at the time of misfire depends on the rotation speed NE and the like is smaller than when the rotation change value $\Delta NE$ is quantified as a difference in cylinder-specific rotation time period T120. Thus, the number of steps for adjusting each determination value can be decreased.

A determination as to whether the opposing-pair cylinder misfire or the consecutive two-cylinder continuous misfire is present can be made by using the amplitude A1 of the first order cycle component, the amplitude A2 of the second order cycle component, and the amplitude A3 of the third order cycle component.

Other Embodiments

At least one of each constituent of the embodiment may be changed as follows.
First Order, Second Order, and Third Order Component Calculation Processes While, in the embodiment, the first order cycle component of the rotation change value $\Delta NE$ is calculated by inputting the time series data of the rotation change value $\Delta NE$ into the first order cycle filter, the present disclosure is not limited thereto. For example, the time series data of the cylinder-specific rotation speed $\omega 120$ may be input into the first order cycle filter, and the first order cycle component of the rotation change value $\Delta NE$ may be calculated based on the output value of the first order cycle filter. Alternatively, for example, the time series data of the cylinder-specific rotation time period T120 may be input into the first order cycle filter, and the first order cycle component of the rotation change value $\Delta NE$ may be calculated based on the output value of the first order cycle filter. Alternatively, for example, the time series data of the instantaneous rotation time period T30 may be input into the first order cycle filter, and the first order cycle component of the rotation change value $\Delta NE$ may be calculated based on the output value of the first order cycle filter. The first order cycle filter is not limited to the FIR filter.

While, in the embodiment, the second order cycle component of the rotation change value $\Delta NE$ is calculated by inputting the time series data of the rotation change value $\Delta NE$ into the second order cycle filter, the present disclosure is not limited thereto. For example, the time series data of the cylinder-specific rotation speed $\omega 120$ may be input into the second order cycle filter, and the second order cycle component of the rotation change value $\Delta NE$ may be calculated based on the output value of the second order cycle filter. Alternatively, for example, the time series data of the cylinder-specific rotation time period T120 may be input into the second order cycle filter, and the second order cycle component of the rotation change value $\Delta NE$ may be calculated based on the output value of the second order cycle filter. Alternatively, for example, the time series data of the instantaneous rotation time period T30 may be input into the second order cycle filter, and the second order cycle component of the rotation change value $\Delta NE$ may be calculated based on the output value of the second order cycle filter. The second order cycle filter is not limited to the FIR filter.

While, in the embodiment, the third order cycle component of the rotation change value $\Delta NE$ is calculated by inputting the time series data of the rotation change value $\Delta NE$ into the third order cycle filter, the present disclosure is not limited thereto. For example, the time series data of the cylinder-specific rotation speed c 120 may be input into the third order cycle filter, and the third order cycle component of the rotation change value $\Delta NE$ may be calculated based on the output value of the third order cycle filter. Alternatively, for example, the time series data of the cylinder-specific rotation time period T120 may be input into the third order cycle filter, and the third order cycle component of the rotation change value $\Delta NE$ may be calculated based on the output value of the third order cycle filter. Alternatively, for example, the time series data of the instantaneous rotation time period T30 may be input into the third order cycle filter, and the third order cycle component of the rotation change value $\Delta NE$ may be calculated based on the output value of the third order cycle filter. The third order cycle filter is not limited to the FIR filter.

Calculation of the first order cycle component, the second order cycle component, and the third order cycle component may be changed. For example, as disclosed in "Internal Combustion Engine", when an eight-cylinder internal combustion engine is used, a fourth order cycle component may be calculated instead of the third order cycle component, and the presence of misfire may be determined using the fourth order cycle component.
Misfire Determination Process The process of determining the presence of the intermittent misfire in the six-cylinder internal combustion engine may be performed at a time other than the times after the processes of S22 and S26. For example, a determination process as to whether or not the logical product of the logical value of whether or not the magnitude of each of the amplitudes A1, A2, A3 exceeds the corresponding determination value, and the logical value of whether or not the phase of the first order cycle component and the phase of the third order cycle component are opposite phases is true may be executed independently of the processes of S22 and S26. Alternatively, for example, a determination process as to whether or not the logical product of the logical value of whether or not the magnitude of each of the amplitude A2 and the amplitude A3 exceeds the corresponding determination value, and the logical value of whether or not the phase of the first order cycle component and the phase of the third order cycle component are opposite phases is true may be executed.

The process of determining the interval between the compression top dead centers of cylinders having continuous misfire based on comparison between the phases of a pair of components is not limited to determination of the intermittent misfire and the one-cylinder continuous misfire in the six-cylinder internal combustion engine. For example, as disclosed in "Internal Combustion Engine", when the misfire determination process is performed for the eight-cylinder internal combustion engine, the interval between the compression top dead centers of two cylinders having continuous misfire has a plurality of values. Thus, it may be difficult to specify the interval with merely the strength of components. In such a case, it is effective to compare the phases of the components. In such a case, as disclosed in "First Order, Second Order, and Third Order Component Calculation Processes", it is also effective to compare the phase of the fourth order cycle component with the phase of another component.

Rotation Change Value

The cylinder-specific rotation speed that is used in calculation of the rotation change value ΔNE is not limited to the rotation speed in a range of 30 ATDC to 150 ATDC. For example, as disclosed in "Internal Combustion Engine", when the number of cylinders of the internal combustion engine is four, the cylinder-specific rotation speed may be the rotation speed in a range of 180° CA. Such a configuration does not mean that the rotation speed in a range of "720° CA/N" should be used as the cylinder-specific rotation speed in an internal combustion engine having N cylinders. For example, in the six-cylinder internal combustion engine, the cylinder-specific rotation speed may be the rotation speed in a range of 60 ATDC to 150 ATDC.

While, in the embodiment, the rotation change value ΔNE is set as the difference in cylinder-specific rotation speed that is the rotation speed in the rotation angle interval showing the influence of combustion in each of the cylinders successive in time series order of compression top dead center timing, the present disclosure is not limited thereto. For example, the rotation change value ΔNE may be set as the difference in time period needed for rotation corresponding to the rotation angle interval that shows the influence of combustion in each of the cylinders successive in time series order of compression top dead center. Specifically, for example, the rotation change value ΔNE may be set as the difference between the cylinder-specific rotation time periods T120 adjacent to each other in time series order.

The technique of quantifying the difference in the rotational behavior of the crankshaft shown on the crank signal in the rotation angle interval that shows the influence of combustion in each of the cylinders successive in time series order of compression top dead center is not limited to the technique that uses the difference in cylinder-specific rotation speed or the difference in cylinder-specific rotation time period. For example, a quantity that corresponds to the cylinder-specific rotation speed of each cylinder may be calculated as a value acquired by subtracting the instantaneous speed in a range of 30 ATDC to 60 ATDC from the instantaneous speed in a range of 90 ATDC to 120 ATDC, and the difference in the corresponding quantity related to the cylinders adjacent to each other in time series order of compression top dead center may be calculated. Alternatively, for example, cylinder-specific torque that is torque in the rotation angle interval may be calculated based on a plurality of instantaneous speeds in an interval of the rotation angle interval shorter than the rotation angle interval, and the difference in the rotational behavior of the crankshaft may be quantified as a difference in cylinder-specific torque. Alternatively, as disclosed in JP 10-54295 A, the difference between values at 360° CA from the difference in cylinder-specific rotation speed may be used.

The rotation change value ΔNE is not limited to the difference in cylinder-specific rotation speed or quantity or the like corresponding to the cylinder-specific rotation speed between the cylinders adjacent to each other in time series order of compression top dead center timing. For example, the rotation change value ΔNE may be the difference in cylinder-specific rotation speed ω120 between the cylinders with another cylinder interposed therebetween in time series order of compression top dead center. That is, for example, the rotation change value ΔNE may be a value or the like acquired by subtracting the cylinder-specific rotation speed ω120 of the first cylinder #1 from the cylinder-specific rotation speed ω120 of the third cylinder #3.

Determination Value

Each of the first order determination value O1th for opposing-pair misfire, the second order determination value O2th for opposing-pair misfire, the third order determination value O3th for opposing-pair misfire, the first order determination value C1th for consecutive two-cylinder continuous misfire, the second order determination value C2th for consecutive two-cylinder continuous misfire, the third order determination value C3th for consecutive two-cylinder continuous misfire, and the pre-identification determination value Bth may not be changed according to the rotation speed NE and the load KL. For example, at least one of the determination values may be changed according to merely the rotation speed NE, changed according to merely the load KL, or set as a fixed value.

Strength of Component

While the strength of the first order component is quantified as the amplitude A1 of the first order component in the embodiment, the present disclosure is not limited thereto. For example, in the embodiment, the strength of the first order component may be quantified as the absolute value of the minimum value thereof in one combustion cycle. In such a case, for example, each of the first order determination value O1th for opposing-pair misfire, the first order determination value C1th for consecutive two-cylinder continuous misfire, and the pre-identification determination value Bth may be set to a negative value. Alternatively, each determination value may be set to a value having a smaller absolute value when the rotation speed NE is high than when the rotation speed NE is low, or a value having a greater absolute value when the load KL is high than when the load KL is low. Similarly, the strength of the second order component, the strength of the third order component, and the like may be quantified as the absolute value of the minimum value thereof in one combustion cycle.

Process for Notifying External Entity of Misfire Detection Result

While the embodiment illustrates the process of operating the warning lamp 54 and the process of storing the content of the malfunction in the non-volatile memory 46 as the process for notifying an external entity of the misfire detection result, the present disclosure is not limited thereto. For example, merely the process of storing the content of the malfunction in the non-volatile memory 46 may be executed, or, for example, merely the process of operating the warning lamp 54 may be executed. Alternatively, a process of outputting an audio signal indicating the presence of the malfunction from a speaker may be performed, or a process of outputting a radio signal related to the content or the like of the malfunction to an external entity may be performed. That is, an electronic device in the process of operating an electronic device in order to notify an external entity of the presence of the malfunction is not limited to the warning lamp 54 or the non-volatile memory 46, and may be a speaker, a radio transmitter, and the like.

Internal Combustion Engine

The internal combustion engine 10 is not limited to the six-cylinder internal combustion engine. For example, the internal combustion engine 10 may have four cylinders or eight cylinders. Even with such a configuration, when the opposing-pair cylinder misfire occurs, a noticeable difference occurs between the minimum value and the maximum value of the second order cycle component while the first order cycle component or the third order cycle component does not have a noticeable difference between the minimum value and the maximum value thereof.

The internal combustion engine is not limited to an internal combustion engine in which torque is adjusted with the amount of air filling each cylinder and, for example, may be an internal combustion engine in which torque is adjusted according to the amount of injection, like a diesel engine. In such a case, the load KL may be replaced with the amount of injection or the accelerator operation amount.

Misfire Detection Device

The misfire detection device is not limited to a misfire detection device that includes the CPU 42 and the ROM 44 and executes a software process. For example, the misfire detection device may include a dedicated hardware circuit (for example, an ASIC) that performs a hardware process for at least a part of the software process in the embodiment. That is, the misfire detection device may have any of the following configurations (a) to (c).

(a) The misfire detection device includes a processing device that executes the entirety of the process in accordance with a program, and a program storage device such as a ROM that stores the program.

(b) The misfire detection device includes a processing device executing a part of the process in accordance with a program, a program storage device, and a dedicated hardware circuit executing the remaining process.

(c) The misfire detection device includes a dedicated hardware circuit that executes the entirety of the process.

The misfire detection device may include a plurality of software processing circuits including the processing device and the program storage device, or a plurality of dedicated hardware circuits. That is, the process may be executed by a processing circuit that includes one or a plurality of software processing circuits, or one or a plurality of dedicated hardware circuits, or both thereof.

When the misfire detection device includes a dedicated hardware circuit, at least one of three processes of the filtering process for calculating the first order cycle component, the filtering process for calculating the second order cycle component, and the filtering process for calculating the third order cycle component may be executed with an analog filter.

Others

The crankshaft 12 may not be configured to be connected to the drive wheel 36 through the torque converter 30 and the transmission device 32. For example, a planetary gear mechanism to which a motor generator and a drive wheel are mechanically connected may be mechanically connected to the crankshaft 12. The interval between the tooth portions 22 of the crank rotor 20 is not limited to 10° CA. The instantaneous rotation time period is not limited to a time period needed for a rotation of 30° CA.

What is claimed is:

1. A misfire detection device for an internal combustion engine that includes a plurality of cylinders, the misfire detection device comprising
an electronic control unit configured to:
detect continuous misfire in at least one cylinder based on a rotation change value, the rotation change value being a value quantified as a difference in a rotational behavior of a crankshaft shown on a crank signal in a rotation angle interval that shows an influence of combustion in each of a pair of cylinders successive in time series order of compression top dead center timing;
execute a first component calculation process based on the crank signal, the first component calculation process being a process of calculating a first component that is a first integer multiple frequency component of a combustion cycle related to the rotation change value;
execute a second component calculation process based on the crank signal, the second component calculation process being a process of calculating a second component that is different from the first component and is a second integer multiple frequency component of the combustion cycle related to the rotation change value;
determine whether the second component has a maximum value or a minimum value in at least one of two phases of a phase where the first component has a maximum value and a phase where the first component has a minimum value; and
execute a misfire determination process of determining an interval between compression top dead centers of cylinders having the continuous misfire based on a determination result of whether the second component has the maximum value or the minimum value.

2. The misfire detection device according to claim 1, wherein
the misfire determination process is a process of determining the interval between the compression top dead centers of the cylinders having the continuous misfire based on the determination result of whether the second component has the maximum value or the minimum value, and a result of magnitude comparison between strength of at least one component of the first component and the second component and a determination value related to the strength.

3. The misfire detection device according to claim 2, wherein
the electronic control unit is configured to execute a changing process of setting the determination value related to the strength to a smaller value when a rotation speed of the crankshaft is high than when the rotation speed of the crankshaft is low.

4. The misfire detection device according to claim 3, wherein the rotation change value is a value acquired by subtracting the rotation speed in a rotation angle interval showing the influence of combustion in one of the cylinders successive in time series order of compression top dead center from the rotation speed in a rotation angle interval showing the influence of combustion in the other cylinder.

5. The misfire detection device according to claim 2, wherein
the electronic control unit is configured to execute a determination value setting process of setting the determination value related to the strength to a greater value when a load of the internal combustion engine is high than when the load of the internal combustion engine is low.

6. The misfire detection device according to claim 5, wherein the rotation change value is a value acquired by subtracting the rotation speed in a rotation angle interval showing the influence of combustion in one of the cylinders successive in time series order of compression top dead center from the rotation speed in a rotation angle interval showing the influence of combustion in the other cylinder.

7. The misfire detection device according to claim 1, wherein
the electronic control unit is configured to calculate a third component based on the crank signal,
the third component is different from the first component and the second component and is a third integer multiple component of the combustion cycle related to the rotation change value,
the first component is a first order cycle component,
the second component is a third order cycle component,
the third component is a second order cycle component, and
the electronic control unit is configured to execute an opposing-pair misfire determination process when the electronic control unit determines that strength of the first order cycle component is smaller than a first order determination value for opposing-pair misfire, strength of the third order cycle component is smaller than a third order determination value for opposing-pair misfire, and strength of the second order cycle component exceeds the second order determination value for opposing-pair misfire, and
the opposing-pair misfire determination process is a process of determining that continuous misfire is present in a pair of cylinders of the cylinders, the pair of cylinders being at an interval corresponding to one rotation in order of compression top dead center timing.

8. The misfire detection device according to claim 1, wherein the internal combustion engine is a six-cylinder internal combustion engine,
wherein the first component is a first order cycle component,
the second component is a third order cycle component, and
the misfire determination process includes at least one of two processes of a process of determining that continuous misfire is present in a pair of cylinders with one cylinder interposed between the pair of cylinders in time series order of compression top dead center, based on a determination that the third order cycle component has a minimum value in a phase where the first order cycle component has a maximum value, and a process of determining that continuous misfire is present in a pair of cylinders with one cylinder interposed between the pair of cylinders in time series order of compression top dead center, based on a determination that the third order cycle component has a maximum value in a phase where the first order cycle component has a minimum value.

* * * * *